(12) United States Patent
Zhao et al.

(10) Patent No.: US 7,767,619 B2
(45) Date of Patent: Aug. 3, 2010

US007767619B2

(54) PROMOTED CALCIUM-ALUMINATE SUPPORTED CATALYSTS FOR SYNTHESIS GAS GENERATION

(75) Inventors: Shizhong Zhao, Louisville, KY (US); Yeping Cai, Louisville, KY (US); Xiao D. Hu, Louisville, KY (US); Jon P. Wagner, Louisville, KY (US); Jürgen Ladebeck, Louisville, KY (US); R. Steve Spivey, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 1166 days.

(21) Appl. No.: 10/888,645

(22) Filed: Jul. 9, 2004

(65) Prior Publication Data

US 2006/0009352 A1 Jan. 12, 2006

(51) Int. Cl.
*B01J 23/00* (2006.01)
*B01J 21/00* (2006.01)
*B01J 20/00* (2006.01)

(52) U.S. Cl. .............. 502/327; 502/302; 502/303; 502/304; 502/328; 502/332; 502/333; 502/334; 502/335; 502/336; 502/337; 502/338; 502/339; 502/341; 502/349; 502/350; 502/351; 502/355; 502/414; 502/415; 502/439

(58) Field of Classification Search .............. 502/302, 502/303, 304, 327, 328, 332–339, 341, 349–351, 502/355, 414–415, 439
See application file for complete search history.

(56) References Cited

U.S. PATENT DOCUMENTS

| | | | | |
|---|---|---|---|---|
| 3,391,089 A | * | 7/1968 | Mayland et al. | 502/328 |
| 3,522,024 A | * | 7/1970 | Billings et al. | 48/214 A |
| 3,533,963 A | * | 10/1970 | Gignier et al. | 502/306 |
| 3,759,678 A | * | 9/1973 | Chamberland et al. | 48/214 A |
| 4,026,823 A | * | 5/1977 | Van Hook et al. | 502/337 |
| 4,157,316 A | * | 6/1979 | Thompson et al. | 502/304 |
| 4,380,589 A | * | 4/1983 | Murchison et al. | 518/714 |
| 4,430,254 A | * | 2/1984 | Passariello | 502/243 |
| 4,460,704 A | | 7/1984 | Twigg | |
| 4,530,918 A | | 7/1985 | Sambrook et al. | |
| 4,619,910 A | * | 10/1986 | Dyer et al. | 502/336 |
| 4,977,129 A | * | 12/1990 | Ernest | 502/330 |
| 5,015,617 A | * | 5/1991 | Ohata et al. | 502/304 |
| 5,100,859 A | * | 3/1992 | Gerdes et al. | 502/439 |
| 5,145,824 A | * | 9/1992 | Buffum et al. | 502/216 |
| 5,212,142 A | * | 5/1993 | Dettling | 502/304 |
| 5,753,143 A | | 5/1998 | Bhat et al. | |
| 5,773,589 A | | 6/1998 | Shoji et al. | |
| 5,856,263 A | * | 1/1999 | Bhasin et al. | 502/333 |
| 6,716,791 B1 | * | 4/2004 | Fuglerud et al. | 502/338 |
| 2002/0172642 A1 | | 11/2002 | Dindi et al. | |

FOREIGN PATENT DOCUMENTS

| | | |
|---|---|---|
| CN | 1087657 | 7/2002 |
| EP | 582004 A1 | 2/1994 |
| GB | 1349449 A | 4/1974 |
| IT | 1298336 | 12/1991 |

\* cited by examiner

*Primary Examiner*—Cam N Nguyen

(57) ABSTRACT

A promoted calcium-alumina supported reforming catalyst that is particularly useful for reforming reactions where low $H_2/CO$ ratio synthesis gas, such as less than 2.3 is generated directly is disclosed. The catalyst comprises from about 25 wt % to about 98 wt % alumina, from about 0.5 wt % to about 35 wt % calcium oxide, from about 0.01 wt % to about 35 wt % of a promoter, and from about 0.05 wt % to about 30 wt % of an active metal. The promoter is selected from the group consisting of titanium, zirconium, yttrium, niobium, elements of the lanthanum-series, such as, without limitation, lanthanum, cerium, praseodymium, neodymium, promethium, samarium, europium, gadolinium, ytterbium, and combinations thereof. The active metal is selected from the group consisting of nickel, cobalt, rhodium, ruthenium, palladium, platinum, iridium and combinations thereof as active metal, wherein the calcium oxide is combined with the alumina to form aluminum-rich calcium aluminates.

21 Claims, No Drawings

PROMOTED CALCIUM-ALUMINATE SUPPORTED CATALYSTS FOR SYNTHESIS GAS GENERATION

BACKGROUND OF THE INVENTION

1. Field of Invention

This invention relates to highly active catalysts useful for syngas generation, and more particularly to promoted calcium-aluminate supported catalysts, wherein the promoter is selected from the group consisting of titanium, zirconium, yttrium, niobium, elements of the lanthanum-series, such as, without limitation, lanthanum, cerium, praseodymium, neodymium, promethium, samarium, europium, gadolinium, ytterbium and combinations thereof. The catalyst comprises an active metal selected from the group consisting of nickel, cobalt, rhodium, ruthenium, platinum, palladium, iridium and combinations thereof. The catalyst is highly active, stable and resistant to coking when used in producing synthesis gas, especially low $H_2/CO$ synthesis gas. A process of manufacture of the catalysts and a process of use of the catalysts are also disclosed.

2. Background Art

Production of synthesis gas or syngas (various blends of gases generally comprising hydrogen and carbon monoxide) is an important process step in the manufacture of numerous chemicals, such as ammonia and methanol. It is also useful in numerous other commercial and developmental processes, such as iron ore reduction, Fischer-Tropsch synthesis and other gas-to-liquid processes. Many of the syngas plants produce the syngas by steam reforming of light hydrocarbons, usually natural gas, and the syngas commonly has an $H_2/CO$ ratio larger than 3. Typically, these plants employ a supported nickel catalyst, usually nickel on an alpha-alumina support or nickel on a promoted-alumina support.

However, a problem that often occurs with reforming reactions is an enhanced likelihood of coking or carbon formation on the catalysts. Several solutions have been proposed to address the coking problem. For example, a large excess of $H_2O$ in the reformer feed stream can be applied in applications where $H_2$ is the target product and CO is only a lower value by-product, such as in ammonium synthesis or hydrogen production. The excess of $H_2O$ generates more $H_2$ via the water-gas-shift reaction. However this solution is not suitable for applications where a low $H_2/CO$ ratio syngas is required, such as for the gas-to-liquid processes.

Another process for limiting carbon formation on nickel catalysts during reforming reactions utilizes sulfur in the feed stream. In this process—referred to as passivation—sulfur poisons some, but not all, of the nickel sites on the catalyst and produces a reforming catalyst which retains sufficient active sites to be useful for syngas production at lower $H_2/CO$ ratios. The amount of sulfur that is present in the feed stream must be carefully controlled so that the catalyst retains sufficient activity for the reforming reaction, and the process often requires a substantial quantity of catalyst in the bed. Further, if sulfur is a poison for downstream catalysts, as in Fischer-Tropsch synthesis processes, the sulfur must be removed before it can travel downstream.

The coking risk may be reduced by modifying the catalyst formulation. For example, U.S. Pat. No. 5,753,143 proposes the use of a noble metal catalyst. It is well known that noble metal catalysts have higher coke formation resistance compared to conventional steam reforming catalysts that merely utilize nickel, but these noble metal catalysts are quite expensive, especially with the large quantity of catalysts that is conventionally utilized for this type of reaction. Morioka has addressed the coking problem by the use of high dispersion of metal species over the surface of the catalyst, such as various types of double hydroxide catalysts. U.S. Pat. No. 4,530,918 teaches a nickel on alumina catalyst with a lanthanum additive.

Conventional steam reforming nickel on alpha-alumina catalysts may include additives to enhance their performance and to reduce the coking problem. For example, alkali compounds may be added to steam reforming catalysts to reduce carbon formation but because of their potential migration during high temperature processing the alkali metals can adversely impact downstream operations. Magnesia has also been added to steam reforming catalysts to suppress carbon formation, but magnesia promoted catalysts are hard to reduce and maintain in a reduced state.

Calcium oxide as a promoter to the nickel on alumina steam reforming catalyst has been successfully used commercially. Better coking resistance and overall performance compared to the alpha-alumina catalyst has been reported. But calcium-rich calcium aluminates in a steam reforming catalyst are not desirable because they can hydrate readily and damage the integrity of the catalyst pellets. Further, as is known in the art, calcium aluminate based catalysts need to be treated to eliminate calcium-rich calcium aluminate phases, such as $12CaO.7Al_2O_3$ and $3CaO.Al_2O_3$, and the aluminum-rich phases, such as $CaO.Al_2O_3$, $CaO.2Al_2O_3$ and $CaO.6Al_2O_3$, need to be stabilized before nickel impregnation.

A higher calcination temperature can force the calcium aluminates to be transformed to the aluminum-rich phases but also cause surface sintering that is not desirable for most catalytic applications. A promoter that facilitates or stops the phase transformation process of calcium aluminates will make the catalyst more stable thermally and catalytically. A phase transfer facilitator would result in the more stable and aluminum-richer calcium aluminate phases with minimized surface sintering while a phase transfer stopper would stabilize the calcium aluminates at aluminum-leaner phases.

Thus, there is still a need for more active, more coking-resistant, and more stable catalysts for syngas generation, especially for the processes that directly produce syngas with $H_2/CO$ ratio less than 2.3.

SUMMARY OF THE INVENTION

The invention relates to a highly active, more coking resistant, and more stable catalyst useful for syngas generation, and more particularly to a promoted calcium-aluminate supported catalyst, wherein the promoter is selected from titanium, zirconium, yttrium, niobium, elements of the lanthanum-series, such as, without limitation, lanthanum, cerium, praseodymium, neodymium, promethium, samarium, europium, gadolinium, ytterbium and combinations thereof, and wherein the catalyst further comprises an active metal selected from nickel, cobalt, rhodium, ruthenium, palladium, platinum, iridium and combinations thereof. The catalyst is used in syngas generation processes, and especially for the processes producing low $H_2/CO$ ratio syngas, such as when the $H_2/CO$ ratio less than 2.3. The catalyst comprises a calcium-aluminate support promoted with from about 0.01 wt % to about 35 wt % titanium, zirconium, yttrium, niobium, elements of the lanthanum-series, such as, without limitation, lanthanum, cerium, praseodymium, neodymium, promethium, samarium, europium, gadolinium, ytterbium, and combinations thereof, and from about 0.05 wt % to about 30 wt % nickel, cobalt, rhodium, ruthenium, palladium, platinum, iridium and combinations thereof. The support comprises from about 25 wt % to about 98 wt % alumina and from about 0.5 wt % to about 35 wt % calcium oxide, wherein the calcium oxide is combined with the alumina to form calcium aluminates.

The invention further comprises a process for the production of the promoted calcium-aluminate supported reforming catalysts for use in syngas generation processes, and especially for the processes producing low $H_2/CO$ ratio syngas, such as when the $H_2/CO$ ratio less than 2.3. The production process comprises combining an aluminum compound and a calcium oxide with a promoter to form a mixture, forming the mixture into a desirable shape, treating the formed mixture with steam, calcining the steamed, formed product at a temperature from about 900° C. to about 1700° C. to form the catalyst precursor, impregnating the catalyst precursor with a metal salt solution, and drying and calcining the impregnated material to form the promoted calcium-aluminate supported catalyst. The promoter may be added, without limitation, with the calcium oxide, or at the time of active metal addition, or after heat treatment.

DETAILED DESCRIPTION OF THE INVENTION

The present invention is a highly active, more coking resistant, and more stable catalyst for use in syngas generation processes, and especially for the processes producing low $H_2/CO$ ratio synthesis gas, such as when the $H_2/CO$ ratio is less than 2.3. The catalyst is a promoted calcium-aluminate supported catalyst, wherein the promoter is selected from titanium, zirconium, yttrium, niobium, elements of the lanthanum-series, such as, without limitation, lanthanum, cerium, praseodymium, neodymium, promethium, samarium, europium, gadolinium, ytterbium and combinations thereof, and wherein the catalyst further comprises an active metal selected from the group consisting of nickel, cobalt, rhodium, ruthenium, palladium, platinum, iridium and combinations thereof. The catalyst of the invention has a considerably higher BET surface area and metal specific surface area and a greater pore volume than conventional alpha-alumina-supported catalysts and is more stable than conventional calcium aluminate supported catalysts such as those used for conventional syngas generation reactions.

The precursor for the catalyst of the invention is prepared by combining a calcium compound and an aluminum compound with a promoter. An exemplary composition of the precursor comprises from about 0.5 wt % to about 35 wt % calcium, and more preferably from about 2 wt % to about 20 wt %, preferably in the form of calcium oxide or calcium aluminates and from about 25 wt % to about 98 wt % of an aluminum oxide, wherein an exemplary composition comprises alpha-alumina or calcium aluminates. The calcium compound used as the precursor of calcium includes but is not limited to calcium carbonate, calcium oxide, any forms of calcium aluminates, calcium nitrate, and calcium hydroxides, preferably calcium oxide, calcium hydroxides, and calcium aluminates. The aluminum compound used as the precursor of aluminum includes but is not limited to aluminum oxide, aluminum hydroxides, aluminum nitrate, any forms of calcium aluminates, and any organic forms of aluminum, preferably aluminum oxide, calcium aluminates, and aluminum hydroxides.

Combined with the aluminum and calcium compounds is from about 0.01 wt % to about 35 wt % of a promoter compound, and more preferably from about 0.1 wt % to about 25 wt %, wherein an exemplary composition comprises oxide of titanium, zirconium, yttrium, niobium, elements of the lanthanum-series, such as, without limitation, lanthanum, cerium, praseodymium, neodymium, promethium, samarium, europium, gadolinium, ytterbium and combinations thereof. The precursor of the promoter compound includes but is not limited to zirconium hydroxide, zirconium oxide, calcium zirconate, zirconium nitrate, zirconium metal, yttrium oxide, yttrium nitrate, yttrium carbonate, yttrium aluminum oxide, yttrium carbide, titanium oxides, titanium hydroxide, calcium titanate, titanium metal, any organic form of titanium compound, niobium oxides, any organic form of niobium compound, and nitrates, oxides, carbonates, hydroxides of the lanthanum group, such as lanthanum oxide, lanthanum hydroxide, lanthanum carbonate, lanthanum nitrate, cerium oxides, cerium hydroxide, cerium carbonate, cerium nitrate, praseodymium oxide, praseodymium nitrate, neodymium nitrate, neodymium oxide, promethium, samarium nitrate, samarium oxide, europium nitrate, europium oxide, gadolinium nitrate, gadolinium oxide, and ytterbium nitrate. The promoter compounds are added to the catalyst, without limitation, with the calcium compound, or at the time of nickel addition, or after heat treatment.

The precursor material is formed such that the calcium compound is combined with the aluminum compound to form various calcium and aluminum combinations, such as hibonite ($CaO.6Al_2O_3$), and other calcium aluminates, such as $CaO.2Al_2O_3$, $CaO.Al_2O_3$, $12CaO.7Al_2O_3$, and $3CaO.Al_2O_3$. Any stable calcium aluminate can be utilized. However, preferably, aluminum-rich calcium aluminates are used, such as $CaO.Al_2O_3$, $CaO.2Al_2O_3$, $CaO.6Al_2O_3$, and no free calcium oxide or calcium-rich calcium aluminates, such as $12CaO.7Al_2O_3$, and $3CaO.Al_2O_3$, should be detectable in the precursor by x-ray diffraction after the formation of the catalyst.

The precursor is formed by conventional procedures. Appropriate quantities of solid alumina and/or aluminum hydroxide and a promoter compound are mixed with calcium aluminate cement, calcium oxide and/or calcium hydroxide. The mixture is then blended with graphite and water to form granules. The granules are then formed into any desirable shape, such as tablets using a tabletting machine, extrusions using an extruder, and small granules using a granulator. An exemplary shape, without limitation, is a cylindrical tablet with one or multiple holes, for example, five to ten holes extending through each tablet. The formed tablets are then treated in a reactor under steam pressure up to 150 psig for about 4 to 24 hours. After steaming, the tablets are calcined to a temperature of from about 250° C. to about 1700° C. for from about 6 hours to about 36 hours to remove moisture, to develop ceramic bonds, and to form the calcium aluminates through solid state reactions. The calcination can be performed in one step or multiple steps without limitation. The resulting calcium aluminate precursor has a BET surface area of at least about 1.5 $m^2/g$, and a pore volume, measured by mercury penetration, of at least about 0.30 cc/g.

After the calcium aluminate precursor material is formed, active metal is loaded onto the precursor by impregnation of the precursor material with a metal salt solution, wherein the metal salt is selected from, but not limited to, nickel nitrate, nickel carbonate, cobalt nitrate, cobalt carbonate, cobalt ammonium tetranitrodiammine, any acid and/or water soluble form of organic cobalt compound, any acid and/or water soluble of rhodium, ruthenium, palladium, platinum, and iridium compounds. The precursor may be impregnated by any means known in the art, for example, the precursor can be immersed in a metal salt solution, such as nickel nitrate, and then dried and calcined at a temperature from about 350° C. to about 650° C. for from about 1 hour to about 5 hours. The impregnation step may be repeated until the target metal loading level is reached. For a reforming catalyst, the recommended metal loading on the precursor is from about 0.05 wt % to about 30 wt %, more preferably from about 3 wt % to about 20 wt % for nickel and cobalt; and from about 0.05 wt % to about 15 wt %, and more preferably from about 0.1 wt % to about 10 wt % for rhodium, ruthenium, palladium, platinum, iridium and combinations thereof.

Because of the presence of the promoters and the calcium aluminate as components of the catalyst support, the catalyst has a substantially larger BET surface area, metal specific surface area, and pore volume than a corresponding conventional alpha-alumina-supported catalysts. For example, the BET surface area of the promoted calcium-aluminate supported nickel catalyst is at least about 4 $m^2/g$, and preferably larger than about 6 $m^2/g$ with an upper limit of about 30 $m^2/g$. The nickel specific surface area on the catalyst, measured by hydrogen chemisorption at room temperature, is greater than about 2 $m^2/g$ and preferably greater than 4 $m^2/g$. In addition, the pore volume of the promoted-calcium-aluminate supported nickel catalyst is greater than about 0.2 cc/g, whereas the typical pore volume for conventional art nickel on alpha-alumina catalysts is only about 0.08 to 0.15 cc/g. These physical characteristics will vary somewhat depending on the promoter and active metal used. For example, if rhodium is used in place of nickel, the BET surface area of the promoted calcium-aluminate supported rhodium catalyst is at least about 1.5 $m^2/g$, and is preferably at least about 3.5 $m^2/g$. The addition of the promoters to the catalyst alters the phase composition of the final catalyst to a more favorable and stable structure for the generation of syngas. For example, the promoters may further improve the BET surface area and metal dispersion on the catalyst body. The catalyst body is more stable both physically and chemically during the generation of syngas and in the transition periods such as idling, start up, and shut down.

The catalyst of the invention is especially useful for reforming reactions, especially for processes where the product has a $H_2/CO$ ratio of less than 2.3. The general term reforming reactions used in this invention include partial oxidization, steam reforming, $CO_2$-reforming, autothermal reforming and any modified reactions that applied steam, oxygen, carbon dioxide, or the combinations to reform light hydrocarbons, usually natural gas, to generate syngas.

In order to illustrate the present invention and advantages thereof, the following examples are provided. It is understood that these examples are illustrative and do not provide any limitation on the invention. In particular, it is important to understand that the present invention is generally applicable to reforming reactions, and especially for the production of low $H_2/CO$ ratio syngas, such as $H_2/CO$ less than 2.3.

Comparative Example 1

A catalyst carrier is prepared by blending about 36.29 kg of aluminum hydroxide and 11.24 kg of calcium aluminate cement with 6.2 kg distilled water and 2.7 kg graphite. The mixture is then tabletted, autoclaved at 20-100 psig for about 10 hours, and calcined for about 8 hours at 120° C.-400° C. followed by calcining for about 5 hours at 1250° C.-1350° C. The precursor is determined to contain 5.7 wt % calcium oxide with the balance being alumina. The precursor is then analyzed under x-ray diffraction and discovered to be comprised of major phases of alpha-alumina, hibonite ($CaO.6Al_2O_3$), and calcium bialuminate ($CaO.2Al_2O_3$). Very small calcium monoaluminate ($CaO.Al_2O_3$) peaks are also present as detected by XRD. However, there is no detectable free calcium oxide or calcium aluminates that contain aluminum leaner than calcium monoaluminate ($CaO.2Al_2O_3$). The precursor has a BET surface area of 2.5 $m^2/g$ and a pore volume (measured by mercury penetration method) of 0.45 cc/g. The precursor carrier is then impregnated with a nickel nitrate solution containing about 15 wt % nickel. The impregnated precursor is then calcined for about 2 hours at 400° C.-600° C. After calcination, the impregnation and calcination procedures are repeated twice for a total of three impregnations and three calcinations. The finished catalyst contains 13.3 wt % nickel. The physical and performance characteristics of the catalyst are reported in Table 1 and Table 2.

Comparative Example 2

A catalyst is prepared as disclosed in Example 1 except the mixture comprises 100 kg of aluminum hydroxide, 10.9 kg of calcium hydroxide, 38.1 kg of calcium aluminate cement and 9.1 kg of graphite, and the resulting precursor has a 17.2 wt % loading of calcium oxide with the balance being alumina. The major phases of the precursor are determined to be alpha-alumina, hibonite ($CaO.6Al_2O_3$), and calcium bi-aluminate ($CaO.2Al_2O_3$). Calcium monoaluminate ($CaO.Al_2O_3$) exists as a minor phase. No free calcium oxide or calcium aluminates that contain aluminum leaner than calcium monoaluminate ($CaO.Al_2O_3$) are detectable by XRD. The precursor has a BET surface area of 2.4 $m^2/g$ and a pore volume of 0.38 cc/g. Sufficient nickel nitrate is then impregnated onto the precursor to yield a nickel loading, after calcination, of 15.8 wt %. The physical characteristics and performance characteristics of this catalyst are disclosed in Table 1.

Comparative Example 3

A catalyst is prepared as disclosed in Example 2 except sufficient potassium carbonate is added to produce a precursor having a 16.8 wt % calcium oxide loading and a 2.0 wt % potassium oxide loading. A precursor is initially blended, tabletted, autoclaved and calcined at 120° C.-400° C. as in Example 1. The potassium carbonate is then added, and the material is calcined for about 8 hours at 120° C.-400° C. followed by calcining for about 5 hours at 1250° C.-1350° C. When the precursor is analyzed by x-ray diffraction, the major phases of the precursor are determined to be calcium bialuminate, calcium monoaluminate and alpha-alumina. A small percentage of potassium aluminate $KAl_{11}O_{17}$ is also determined to be present. No free calcium oxide or calcium aluminates that contain aluminum leaner than calcium monoaluminate are detectable. Sufficient nickel nitrate is impregnated onto the precursor to yield a nickel loading, after calcination, of 17.1 wt %. The physical characteristics and performance characteristics of this catalyst are disclosed in Table 1.

Comparative Example 4

A catalyst carrier is prepared by blending 100 kg alumina powder with 400 kg water in a mixer to make a slurry. The slurry is spray dried at a temperature of 120° C. to 370° C. About 1 kg aluminum stearate powder is then added to the mixture and the mixture is tabletted and calcined at 1400° C.-1600° C. for about 5 hours to form the catalyst precursor. The only phase of the precursor detected by XRD is alpha-alumina. The precursor is then impregnated with sufficient nickel nitrate to yield a nickel loading, after calcination, of 14.8 wt %. The physical characteristics and performance characteristics of this catalyst are disclosed in Table 1.

Example 5

A catalyst precursor is prepared as disclosed in Example 1. Before the 1250° C.-1350° C. calcination step, sufficient lanthanum, in the form of La(NO$_3$)$_3$ solution, is impregnated on the precursor to yield a lanthanum loading, after calcination, of 6.3 wt %. The lanthanum-impregnated calcium aluminate precursor is then impregnated with a Ni(NO$_3$)$_2$ solution to give 8.2 wt % Ni loading after the nitrate was decomposed. The catalyst contains alpha-alumina, lanthanum aluminate (LaAlO$_3$), hibonite, calcium bialuminate, and nickel oxide as detected by XRD. No free calcium oxide or calcium aluminates that contain aluminum leaner than calcium monoaluminate are detectable. The physical characteristics and performance characteristics of this catalyst are disclosed in Table 1 and Table 2. The catalyst has significantly higher pore volume, BET surface area, nickel specific surface area, and significantly smaller nickel or nickel oxide crystal size than the catalyst in Example 1.

Example 6

A catalyst precursor is prepared as disclosed in Example 1. The precursor is then impregnated with a solution containing La(NO$_3$)$_3$ and Ni(NO$_3$)$_2$ and the nitrate is decomposed at about 400° C. to about 600° C. for about 2 hours. The resulting catalyst comprises about 3.3 wt % La and about 10.7 wt % Ni. The catalyst contains alpha-alumina, hibonite, calcium bialuminate, and nickel oxide as detected by XRD. No free calcium oxide or calcium aluminates that contain aluminum leaner than calcium monoaluminate are detectable. The physical characteristics and performance characteristics of this catalyst are disclosed in Table 1. This catalyst has a slightly smaller pore volume and significantly lower BET surface area than the catalyst in Example 1.

Example 7

A catalyst is prepared by blending about 36.29 kg of aluminum hydroxide and 11.24 kg of calcium aluminate cement with 6.2 kg distilled water and 2.7 kg graphite and about 2.53 kg La$_2$(CO$_3$)$_3$. The mixture is then tabletted, autoclaved at 20-100 psig for about 10 hours, and calcined for about 8 hours at 120° C.-400° C. followed by calcining for about 5 hours at 1250° C.-1350° C. Sufficient nickel nitrate is then impregnated onto the precursor to yield a nickel loading, after calcination, of 9.2 wt %. The resulting catalyst comprises about 3.5 wt % La. The catalyst contains alpha-alumina, lanthanum aluminate (LaAlO$_3$), hibonite, calcium bialuminate, and nickel oxide as detected by XRD. No free calcium oxide or calcium aluminates that contain aluminum leaner than calcium monoaluminate are detectable. The physical and performance characteristics of the catalyst are reported in Table 1. This catalyst has similar pore volume and significantly higher BET surface area than the catalyst in Example 1.

Example 8

A catalyst is prepared by blending about 36.29 kg of aluminum hydroxide and 11.24 kg of calcium aluminate cement with 6.2 kg distilled water and 2.7 kg graphite and about 0.70 kg La$_2$(CO$_3$)$_3$ and about 0.67 kg TiO$_2$. The mixture is then tabletted, autoclaved at 20-100 psig for about 10 hours, and calcined for about 8 hours at 120° C.-400° C. followed by calcining for about 5 hours at 1250° C.-1350° C. Sufficient nickel nitrate is then impregnated onto the precursor to yield a nickel loading, after calcination, of 8.1 wt %. The resulting catalyst comprises about 0.79 wt % La and about 0.92 wt % Ti. The catalyst contains alpha-alumina, hibonite, calcium bialuminate, and nickel oxide as detected by XRD. No free calcium oxide, lanthanum aluminate, or calcium aluminates that contain aluminum leaner than calcium monoaluminate are detectable. The physical and performance characteristics of the catalyst are reported in Table 1. This catalyst has significantly higher pore volume and BET surface area than the catalyst in Example 1.

Example 9

A catalyst carrier is prepared by blending 36.29 kg of aluminum hydroxide, 0.52 kg of titanium oxide, and 11.24 kg of calcium aluminate cement with 6.2 kg distilled water and 2.7 kg graphite, and then the mixture is tabletted. The tabletted precursor is autoclaved, dried, and then impregnated with La$_2$(CO$_3$)$_3$ solution to yield, after calcination, a lanthanum loading of 2.0 wt % and a titanium loading of 0.88 wt %. The lanthanum-impregnated calcium aluminate precursor is calcined at about 1300° C. for about 5 hours. The tablets are then impregnated with a Ni(NO$_3$)$_2$ solution to give 10.3 wt % Ni loading after the nitrate was decomposed. The catalyst contains alpha-alumina, hibonite, nickel oxide, and a very small amount of calcium bialuminate as detected by XRD. No free calcium oxide, lanthanum aluminate, or calcium aluminates that contain aluminum leaner than calcium monoaluminate are detectable. The physical characteristics and performance characteristics of this catalyst are disclosed in Table 1. This catalyst has similar BET surface area but significantly larger pore volume than the catalyst in Example 1.

Example 10

A catalyst precursor is prepared as disclosed in Example 2 except a Ce(NO$_3$)$_3$ solution is impregnated on the calcium aluminate precursor that has been calcined at 1250° C.-1350° C. to give 4.4 wt % Ce loading after the nitrate was decomposed. Sufficient nickel nitrate is then added onto the precursor via dip method to yield a nickel loading, after calcination, of 11.9 wt %. The catalyst contains hibonite, calcium bialuminate, nickel oxide, cerium oxide, and a very small amount of calcium monoaluminate, as detected by XRD. No free calcium oxide or calcium aluminates that contain aluminum leaner than calcium monoaluminate are detectable. The physical characteristics and performance characteristics of this catalyst are disclosed in Table 1. The catalyst has similar pore volume and BET surface area compared to the catalyst in Example 2.

Example 11

A catalyst was prepared according to Example 10 except Zr(NO$_3$)$_4$ was used in place of Ce(NO$_3$)$_3$. The resulting catalyst comprises about 3.1 wt % Zr and about 11.8 wt % Ni. The catalyst contains hibonite, calcium bialuminate, nickel oxide, zirconium oxide, and a very small amount of calcium monoaluminate, as detected by XRD. No free calcium oxide or calcium aluminates that contain aluminum leaner than calcium monoaluminate are detectable. The physical characteristics and performance characteristics of this catalyst are disclosed in Table 1. The catalyst has similar pore volume and BET surface area compared to the catalyst in Example 2.

Comparative Example 12

A catalyst was prepared according to Example 1 except $Rh(NO_3)_3$ solution was used in place of $Ni(NO_3)_2$ solution for impregnation to give 0.5 wt % Rh loading after the nitrate was decomposed. The catalyst contains hobonite, calcium bialuminate, and a small amount of calcium monoaluminate, as detected by XRD. No free calcium oxide or calcium aluminates that contain aluminum leaner than calcium monoaluminate are detectable. The physical characteristics and performance characteristics of this catalyst are disclosed in Table 1.

Example 13

A catalyst precursor is prepared as disclosed in Example 1. Before the 1250° C.-1350° C. calcination step, sufficient cerium, in the form of $Ce(NO_3)_4$ solution, is impregnated onto the precursor to yield a cerium loading, after calcination, of 3.0 wt %. The cerium-impregnated calcium aluminate precursor is then impregnated with a $Rh(NO_3)_3$ solution to give 0.5 wt % Rh loading after the nitrate was decomposed. The catalyst contains alpha-alumina, hibonite, calcium bialuminate, cerium oxide, and a very small amount of calcium monoaluminate, as detected by XRD. No free calcium oxide or calcium aluminates that contain aluminum leaner than calcium monoaluminate are detectable. The physical characteristics and performance characteristics of this catalyst are disclosed in Table 1.

Example 14

A catalyst was prepared according to Example 7 except tetraammine platinum (II) hydroxide solution was used in place of $Ni(NO_3)_2$ solution for impregnation to give 0.5 wt % Pt loading after calcination. The catalyst contains alpha-alumina, lanthanum aluminate ($LaAlO_3$), hibonite, calcium bialuminate, and a very small amount of calcium monoaluminate, as detected by XRD. No free calcium oxide or calcium aluminates that contain aluminum leaner than calcium monoaluminate are detectable. The physical and performance characteristics of the catalyst are reported in Table 1

TABLE 1

| Sample | PV (cc/g) | SA (m²/g) |
|---|---|---|
| 1 (comp) | 0.28 | 8.0 |
| 2 (comp) | 0.24 | 14.5 |
| 3 (comp) | 0.24 | 26.6 |
| 4 (comp) | 0.12 | 3.3 |
| 5 (inv) | 0.36 | 12.1 |
| 6 (inv) | 0.26 | 4.1 |
| 7 (inv) | 0.29 | 14.4 |
| 8 (inv) | 0.37 | 17.0 |
| 9 (inv) | 0.40 | 7.4 |
| 10 (inv) | 0.25 | 17.3 |
| 11 (inv) | 0.25 | 12.8 |
| 12 (comp) | 0.43 | 2.1 |
| 13 (inv) | 0.44 | 4.8 |
| 14 (inv) | 0.45 | 4.2 |

TABLE 2

| Catalyst | Comp Sample 1 | Inv Sample 5 |
|---|---|---|
| Ni Mean Crystal Size by $H_2$ Chemisorption (Å) | 269 | 197 |
| Ni/NiO Mean Crystal Size by XRD in $H_2$(Å) | | |
| 100° C. NiO | 231 | 115 |
| 200° C. NiO | 287 | 128 |
| 300° C. NiO | 219 | |
| 300° C. Ni | 275 | 69 |
| 400° C. Ni | 222 | 88 |
| 500° C. Ni | 209 | 90 |
| 600° C. Ni | 242 | 162 |
| 700° C. Ni | 335 | 180 |
| 800° C. Ni | 645 | 493 |

Testing Procedures

The catalyst activity for steam reforming is tested in a tubular reactor system. The catalyst is first reduced and then tested at a gas hour space velocity (GHSV) of about 25,000/h. The catalyst particles, having a typical size of about 8×12 mesh, are placed in a catalyst bed to test their performance in steam reforming of methane at 5 psig. The feed stream consists of about 25% of $CH_4$ and 75% of $H_2O$ (all mole basis) with an $H_2O/CH_4$ ratio of about 3. The catalyst activity for steam and carbon dioxide mixed reforming is tested using a feed stream consisting of about 19% CO, 18% $CH_4$, 14% $CO_2$, 13% $H_2O$, 35% $H_2$ (all mole basis) and 2 parts per million $H_2S$. The $H_2O/CH_4$ ratio is 0.74 and the $CO_2/CH_4$ ratio is 0.79. Due to the high GHSV, the reformed gas does not reach thermal dynamic equilibrium even at 1500° F. (815.5° C.). A typical reformed gas has an $H_2/CO$ ratio of 1.8. Autothermal reforming is tested using a feed stream consisting of steam, air, and methane at a GHSV of 500,0001/h, with a $H_2O/CH_4$ ratio of about 0.6 and an $O_2/CH_4$ ratio of about 0.57. Carbon formation resistance is tested in a pressurized reactor at 350 psig (24.1 bars) as carbon formation is more pronounced at elevated pressures. The test temperature is from about 1000° F. (537.8° C.) to about 1500° F. (815.5° C.). N-hexane is used as the feed for the hydrocarbon. The experiments are carried out starting at a $H_2O/C$ ratio of 6.0 and the ratio is gradually decreased until carbon formation is detected.

For either the feed stream containing sulfur or the ones having essentially no sulfur, the catalyst of the present invention has an improved activity index and higher resistance to carbon formation than a conventional nickel on alumina catalyst. Further, the promoted catalysts of the present invention demonstrate activity for a longer period of time than the conventional nickel on alpha-alumina catalyst or the nickel on calcium aluminate catalyst. After about 250 hours on stream, activity of Ni/Ca—Al and Ni/Al is almost the same, but with the addition of a titanium promoter the activity of the Ni/Ca—Al catalyst is increased by about 20%, and when a lanthanum promoter is added the activity of the Ni/Ca—Al catalyst increases nearly two-fold. The precious metal catalysts establish a stable operation in autothermal reforming to form low $H_2/CO$ syngas. High methane conversions and hydrogen selectivities have been reached. The promoted calcium aluminate catalyst (Catalyst 13) showed superior performance to the unprompted calcium aluminate catalyst (Catalyst 12).

It is understood that variations may be made which would fall within the scope of this development. For example, although the catalysts of the present invention are intended for use as reforming catalysts for use in syngas producing processes where low $H_2/CO$ ratio synthesis gas, such as $H_2/CO$ ratio less than 2.3 is generated directly. it is anticipated that these catalysts could be used in other applications where a higher $H_2/CO$ ratio syngas are produced. The scope of the present invention can only be limited by the appended claims.

The invention claimed is:

1. A reforming catalyst for use in a syngas producing process that generates a low $H_2/CO$ ratio synthesis gas, the catalyst comprising:
   a) a support formed from a precursor comprising: from about 25 wt % to about 98 wt % alumina, and from about 0.5 wt % to about 35 wt % calcium oxide, and from about 0.01 wt % to about 35 wt % of a promoter, wherein said promoter is selected from the group consisting of titanium, zirconium, yttrium, niobium, elements of the lanthanum-series, lanthanum, cerium, praseodymium, neodymium, promethium, samarium, europium, gadolinium, ytterbium, and combinations thereof; and
   b) from about 0.05 wt % to about 30 wt % of an active metal loaded onto said support, wherein said active metal is selected from the group consisting of nickel, cobalt, rhodium, ruthenium, palladium, platinum, iridium and combinations thereof.

2. The catalyst of claim 1 wherein the calcium oxide combined with the alumina comprises aluminum-rich calcium aluminates.

3. The catalyst of claim 1 wherein the calcium oxide comprises from about 2 wt % to about 20 wt % of the catalyst.

4. The catalyst of claim 1 having a BET surface area greater than about 1.5 $m^2/g$.

5. The catalyst of claim 1 having a BET surface area from about 2 $m^2/g$ to about 30 $m^2/g$.

6. The catalyst of claim 1 wherein the active metal is selected from a group consisting of nickel, cobalt and combinations thereof and comprises from about 3 wt % to about 20 wt % of the catalyst.

7. The catalyst of claim 6 having a BET surface area greater than about 4 $m^2/g$.

8. The catalyst of claim 6 having a metal specific surface area greater than about 2 $m^2/g$.

9. The catalyst of claim 6 having a metal specific surface area greater than about 4 $m^2/g$.

10. The catalyst of claim 1 wherein the active metal is selected from a group consisting of rhodium, ruthenium, palladium, platinum, iridium and combinations thereof and comprises from about 0.1 wt % to about 10 wt % of the catalyst.

11. The catalyst of claim 1 having a pore volume greater than about 0.2 cc/g.

12. The catalyst of claim 1 wherein the promoter comprises from about 0.1 wt % to about 25 wt % of the catalyst.

13. A reforming catalyst comprising: a precursor comprising from about 25 wt % to about 98 wt % alumina, and from about 0.5 wt % to about 35 wt % calcium oxide, and from about 0.01 wt % to about 35 wt % of a promoter selected from a group consisting of titanium, zirconium, yttrium, niobium, elements of the lanthanum-series, lanthanum, cerium, praseodymium, neodymium, promethium, samarium, europium, gadolinium, ytterbium, and combinations thereof; and from about 0.05 wt % to about 30 wt % of an active metal selected from a group consisting of nickel, cobalt, rhodium, ruthenium, palladium, platinum, iridium and combinations thereof, wherein said active metal is loaded onto said precursor, and said catalyst having a BET surface area greater than about 3.5 $m^2/g$.

14. The catalyst of claim 13 wherein the calcium oxide comprises from about 2 wt % to about 20 wt % of the catalyst.

15. The catalyst of claim 13 wherein the active metal is selected from a group consisting of nickel, cobalt and combination thereof and comprises from about 3 wt % to about 20 wt % of the catalyst.

16. The catalyst of claim 13 wherein the active metal is selected from a group consisting of rhodium, ruthenium, palladium, platinum, iridium and a combination thereof and comprises from about 0.1 wt % to about 10 wt % of the catalyst.

17. The catalyst of claim 13 having a BET surface area from about 4 $m^2/g$ to about 30 $m^2/g$.

18. The catalyst of claim 13 having a pore volume greater than about 0.2 cc/g.

19. A reforming catalyst comprising: a precursor comprising from about 25 wt % to about 98 wt % alumina, and from about 2 wt % to about 20 wt % calcium oxide, and from about 0.01 wt % to about 35 wt % of a promoter selected from a group consisting of titanium, zirconium, yttrium, niobium, elements of the lanthanum-series, lanthanum, cerium, praseodymium, neodymium, promethium, samarium, europium, gadolinium, ytterbium, and combinations thereof; and from about 0.05 wt % to about 30 wt % of an active metal selected from a group consisting of nickel, cobalt, rhodium, ruthenium, palladium, platinum, iridium and combinations thereof, wherein said active metal is loaded onto said precursor, and said catalyst having a BET surface area of from about 4 $m^2/g$ to about 30 $m^2/g$ and a pore volume greater than about 0.2 cc/g.

20. The catalyst of claim 19 wherein the active metal is selected from a group consisting of nickel, cobalt and combination thereof and comprises from about 3 wt % to about 20 wt % of the catalyst.

21. The catalyst of claim 19 wherein the active metal is selected from a group consisting of rhodium, ruthenium, palladium, platinum, iridium and a combination thereof and comprises from about 0.1 wt % to about 10 wt % of the catalyst.

* * * * *